(12) United States Patent
Brunstetter et al.

(10) Patent No.: US 9,083,202 B2
(45) Date of Patent: Jul. 14, 2015

(54) ALTERNATOR CONTROL FOR BATTERY CHARGING

(71) Applicants: Craig A Brunstetter, Fenton, MI (US); John R Jaye, Northville, MI (US); Glen E Tallarek, Grosse Pointe Woods, MI (US); Joseph B Adams, Northville, MI (US)

(72) Inventors: Craig A Brunstetter, Fenton, MI (US); John R Jaye, Northville, MI (US); Glen E Tallarek, Grosse Pointe Woods, MI (US); Joseph B Adams, Northville, MI (US)

(73) Assignee: FCA US LLC, Auburn Hills, MI (US)

( * ) Notice: Subject to any disclaimer, the term of this patent is extended or adjusted under 35 U.S.C. 154(b) by 292 days.

(21) Appl. No.: 13/718,650

(22) Filed: Dec. 18, 2012

(65) Prior Publication Data

US 2014/0167707 A1    Jun. 19, 2014

(51) Int. Cl.
*B60K 1/00* (2006.01)
*B60K 6/20* (2007.10)
*B60K 20/00* (2006.01)
(Continued)

(52) U.S. Cl.
CPC .............. *H02J 7/16* (2013.01); *B60L 11/1861* (2013.01); *H02J 7/14* (2013.01); *H02J 7/1446* (2013.01); *H02J 7/1453* (2013.01); *H02J 7/245* (2013.01); *B60L 2240/545* (2013.01); *B60L 2240/547* (2013.01); *B60L 2240/549* (2013.01); *B60W 10/24* (2013.01); *B60W 10/26* (2013.01); *Y02T 10/705* (2013.01); *Y02T 10/7005* (2013.01); *Y02T 10/7038* (2013.01);
(Continued)

(58) Field of Classification Search
CPC ............ Y02T 10/7005; Y02T 10/7038; Y02T 10/7044; Y02T 10/705; Y02T 10/7055; Y02T 10/7072; Y02T 10/7077; Y02T 10/7083; Y02E 60/12; B60W 10/24; B60W 10/26
USPC .............. 320/162, 104, 150; 180/65.1, 65.21, 180/65.29, 65.31; 318/261
See application file for complete search history.

(56) References Cited

U.S. PATENT DOCUMENTS 4,651,081 A * 3/1987 Nishimura et al. ........... 320/123
4,709,202 A   11/1987 Koenck et al.
(Continued)

FOREIGN PATENT DOCUMENTS

DE    102005046342 A1    4/2007
EP         2453546 A1    5/2012
(Continued)

OTHER PUBLICATIONS

International Search Report and Written Opinion dated Jun. 18, 2014 for International Application No. PCT/US2013/074292, International Filing Date Dec. 11, 2013.

*Primary Examiner* — Stacy Whitmore
(74) *Attorney, Agent, or Firm* — Ralph E Smith

(57) ABSTRACT

In accordance with an aspect of the present disclosure, an electrical system for an automotive vehicle has an electrical generating machine and a battery. A set point voltage, which sets an output voltage of the electrical generating machine, is set by an electronic control unit (ECU). The ECU selects one of a plurality of control modes for controlling the alternator based on an operating state of the vehicle as determined from vehicle operating parameters. The ECU selects a range for the set point voltage based on the selected control mode and then sets the set point voltage within the range based on feedback parameters for that control mode. In an aspect, the control modes include a trickle charge mode and battery charge current is the feedback parameter and the ECU controls the set point voltage within the range to maintain a predetermined battery charge current.

20 Claims, 3 Drawing Sheets

(51) Int. Cl.
*H02J 7/14* (2006.01)
*H02J 7/16* (2006.01)
*H02P 1/00* (2006.01)
*B60L 11/18* (2006.01)
*H02J 7/24* (2006.01)
*B60W 10/24* (2006.01)
*B60W 10/26* (2006.01)

(52) U.S. Cl.
CPC ......... *Y02T 10/7044* (2013.01); *Y02T 10/7072* (2013.01); *Y02T 10/7077* (2013.01); *Y02T 10/92* (2013.01)

(56) References Cited

U.S. PATENT DOCUMENTS

| | | | |
|---|---|---|---|
| 4,716,354 A | 12/1987 | Hacker | |
| 4,845,419 A | 7/1989 | Hacker | |
| 5,463,305 A | 10/1995 | Koenck | |
| 5,528,148 A * | 6/1996 | Rogers | 320/137 |
| 5,589,755 A | 12/1996 | Kaite et al. | |
| 5,608,309 A * | 3/1997 | Hikita et al. | 322/28 |
| 5,642,046 A | 6/1997 | Hawks | |
| 5,656,918 A * | 8/1997 | Pearman et al. | 290/23 |
| 5,696,435 A | 12/1997 | Koenck | |
| 5,961,190 A * | 10/1999 | Brandmeier et al. | 303/152 |
| 6,075,342 A | 6/2000 | Koenck | |
| 6,188,199 B1 | 2/2001 | Beutler et al. | |
| 6,252,380 B1 | 6/2001 | Koenck | |
| 6,271,643 B1 | 8/2001 | Becker et al. | |
| 6,307,349 B1 | 10/2001 | Koenck et al. | |
| 6,607,251 B2 * | 8/2003 | Baumgartner et al. | 303/20 |
| 7,944,183 B2 * | 5/2011 | Nishimura | 322/28 |
| 8,111,036 B2 * | 2/2012 | Rosenstock | 320/104 |
| 8,464,821 B2 * | 6/2013 | Gravino | 180/165 |
| 8,570,000 B2 * | 10/2013 | Hori | 320/162 |
| 8,860,423 B2 * | 10/2014 | Miyamoto | 324/433 |
| 2002/0101218 A1 | 8/2002 | Koenck et al. | |
| 2004/0174018 A1 * | 9/2004 | Itoh | 290/40 C |
| 2008/0191664 A1 * | 8/2008 | Abe | 320/137 |
| 2009/0229898 A1 * | 9/2009 | Fujino et al. | 180/65.29 |
| 2011/0071705 A1 | 3/2011 | Matuszeski et al. | |
| 2011/0162647 A1 | 7/2011 | Huby et al. | |
| 2012/0293124 A1 * | 11/2012 | Hirai et al. | 320/112 |
| 2012/0319653 A1 * | 12/2012 | Kumar et al. | 320/118 |

FOREIGN PATENT DOCUMENTS

| | | |
|---|---|---|
| WO | 9534003 A1 | 12/1995 |
| WO | 2010028427 A1 | 3/2010 |
| WO | 2011037852 A1 | 3/2011 |

* cited by examiner

ALTERNATOR CONTROL FOR BATTERY CHARGING

STATEMENT OF GOVERNMENT INTEREST

Subject matter described herein was developed in part with research funding provided by the United States Government under Grants from the Department of Energy (Grant Number DE-EE0003347). The U.S. Government may have certain rights to the invention.

FIELD

The present invention relates to the control of an alternator for battery charging.

BACKGROUND

Alternators and generators are used to generate electrical power. They are typically used in automotive applications, such as to generate electrical power in automotive vehicles. For convenience, the discussion herein will be in the context of alternators. Alternators and generators may be referred to herein as electrical generating machines.

In applications having a battery, such as automotive vehicles, the alternator is used to charge the battery when the engine of the vehicle is running (which drives the alternator to produce the electrical power.) A voltage regulator is used to regulate the output voltage of the alternator. Typically, the voltage regulator varies the voltage of the field of the alternator to regulate the output voltage of the alternator. In many applications, the alternator has an internal voltage regulator.

In certain applications, an external electronic voltage regulator has been used. In one such application, the external electronic voltage regulator is implemented in the electronic control unit (ECU) that is also used as the engine control module of a vehicle. In this application, the external voltage regulator outputs a pulse width modulated drive signal to the field winding of the alternator and varies field voltage of the alternator to regulate the output voltage of the alternator by varying the duty cycle of the pulse width modulated signal. As used herein, an "electronic voltage regulator" is a device that generates a pulse width modulated drive signal that is used to energize the field windings of an electrical generating machine. The device can be implemented in hardware or a combination of hardware and software. The device can be a stand-alone device or can be implemented as part of another device, such as the engine control module of a vehicle. The electronic voltage regulator can generate the pulse width modulated drive by directly generating it or generate it by controlling another device, such as a power switching device by generating a pulse width modulated switching signal that is used to switch the power switching device.

FIG. 1 is a basic schematic showing the topology of a prior art electrical system 100 in which an external electronic voltage regulator is used to control the voltage of an alternator. Electrical system 100 is illustratively an automotive vehicle electrical system and is a part of an automotive vehicle, shown representatively by dashed box 102 in FIG. 1. The external electronic voltage regulator is illustratively implemented in an electronic control unit ("ECU") 110, that is also the engine control module for vehicle 102. More specifically, electrical system 100 has an alternator 104, battery 106, power distribution center 108 and ECU 110 that is the engine control module. ECU 110 includes an electronic voltage regulator 112 that controls the field voltage of field windings 114 of alternator 104. A voltage output (B+) of alternator 104 is coupled through a fusible link 116 to a positive terminal 118 of battery 106. A negative terminal 120 of battery 106 is coupled to ground. An intelligent battery sensor 138 is coupled to positive terminal 118 of battery 106. Illustratively, intelligent battery sensor 138 is incorporated in a battery terminal clamp (not shown) that attaches to positive terminal 118. Intelligent battery sensor 138 illustratively communicates with ECU 110 via a bus 14, which may be a CAN (controller area network) bus. Intelligent battery sensor 138 monitors battery 106 and communicates data to ECU 110, including but not limited to, current flowing into and out of battery 106 via positive terminal 118 and data indicative of battery faults termed herein ISB faults.

Electronic voltage regulator includes error signal generator 122, PI controller 124, PWM signal generator 126 and power signal driver 128, which is illustratively a high side driver and may be referred to herein as high side driver 128.

The control of alternator 104 is managed by the electronic voltage regulator 112 in ECU 110 based on voltage feedback sense line "B+ Sense" coupled to a "B+ sense" output of alternator 104, which is coupled to the internal voltage output of alternator 104 through a B+ resistor. This sense voltage is compared by error signal generator 122 to a target voltage determined by the ECU 110 based on various parameters known to the ECU 110 from other sensors in the electrical system 100 (not shown in FIG. 1), such as battery temperature, engine speed, engine load and others. The comparison between the sense voltage and the target voltage produces an error signal which is used by PI controller 124 of electronic voltage regulator 112 to calculate the duty cycle for a PWM drive signal applied to field windings 114 of alternator 104 to control the field voltage and thus regulate the output of alternator 104. The field windings 114 of alternator 104 are coupled to an output 130 of ECU 110 at which the PWM drive signal is generated. More specifically, PI controller 124 of electronic voltage regulator 112 determines the duty cycle at which to drive the field windings 114 of alternator 104 and outputs to PWM signal generator 126 the value of this duty cycle, which is the PWM value in FIG. 1. PWM signal generator 126 generates a PWM signal having this duty cycle which is used to switch high side driver 128, which turns on and off the field of alternator 104. High side driver 128 is coupled through contacts 132 of an automatic shutdown relay (ASD) 134 of power distribution center 108 and a fuse 136 of power distribution center 108 to positive terminal 118 of battery 106. High side driver 128 may illustratively be high power switching semiconductor device, such as an SCR, Thyristor, IGBT, power MOSFET, or the like. The objective of this control system is to minimize the error signal, which implies that the sense voltage is being controlled to achieve the target voltage. The PI loop in PI controller 124 of electronic voltage regulator 112 is calibrated to optimize the overshoot, undershoot and settling time performance specifications for system voltage response to various disturbances.

SUMMARY

In accordance with an aspect of the present disclosure, an electrical system for an automotive vehicle has an electrical generating machine and a battery. A set point voltage, which sets an output voltage of the electrical generating machine, is set by an electronic control unit (ECU). The ECU selects one of a plurality of control modes for controlling the alternator based on an operating state of the vehicle as determined from vehicle operating parameters. The ECU selects a range for the set point voltage based on the selected control mode and then sets the set point voltage within the range based on feedback parameters for that control mode. In an aspect, the control modes include a trickle charge mode and battery charge current is the feedback parameter and the ECU controls the set point voltage within the range to maintain a predetermined battery charge current. In the aspect, the control modes also include a regeneration mode, a battery low state of charge (SOC) mode, a passive boost mode, and a default mode. In an aspect, battery temperature is the feedback parameter for the regeneration mode, low SOC mode, passive boost mode and default mode and the voltage set point is controlled to maintain battery charge capacity during a predetermined temperature.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
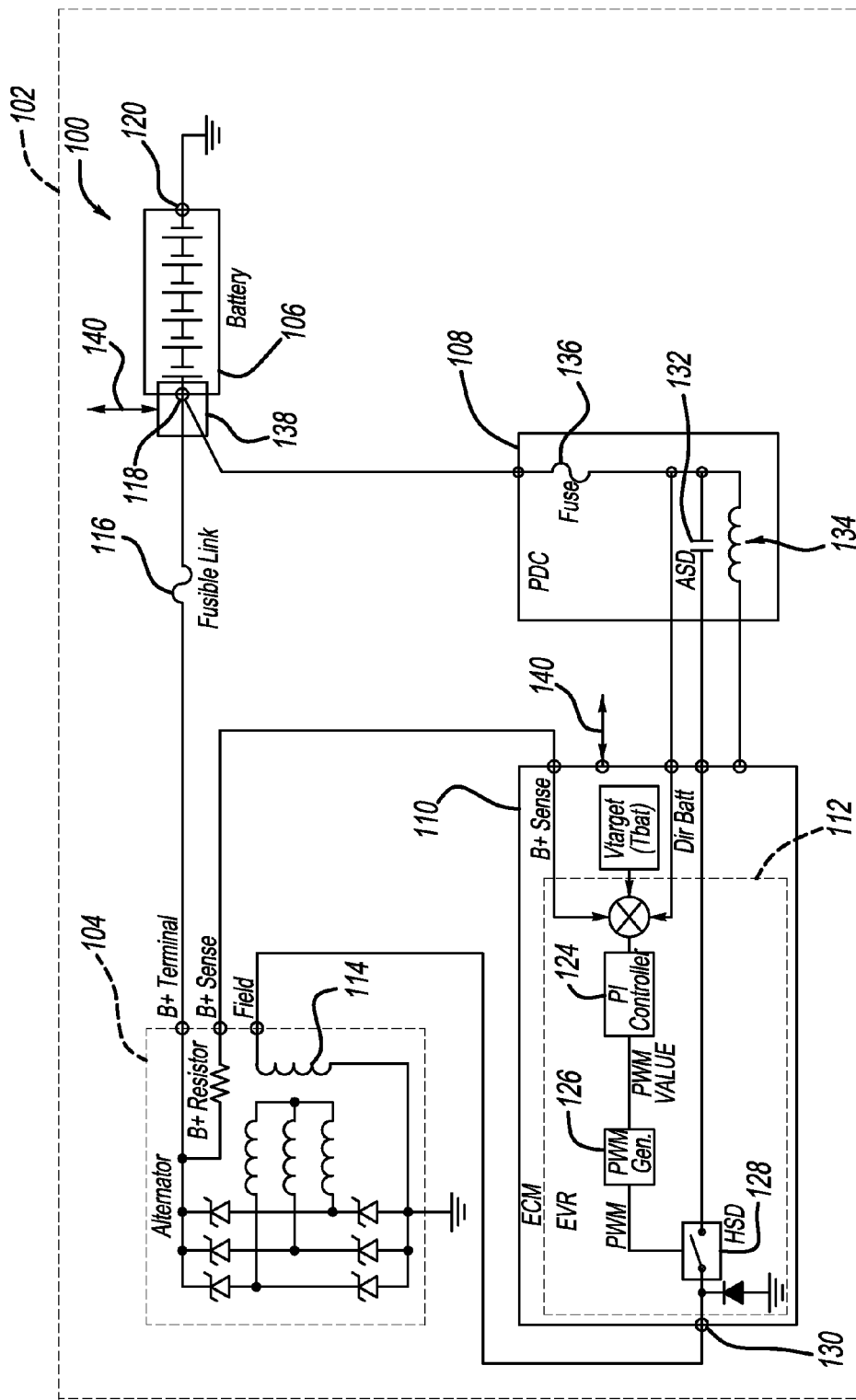
FIG. 1 is a simplified schematic of a prior art vehicle electrical system having an alternator and an external electronic voltage regulator.
Figure 2:
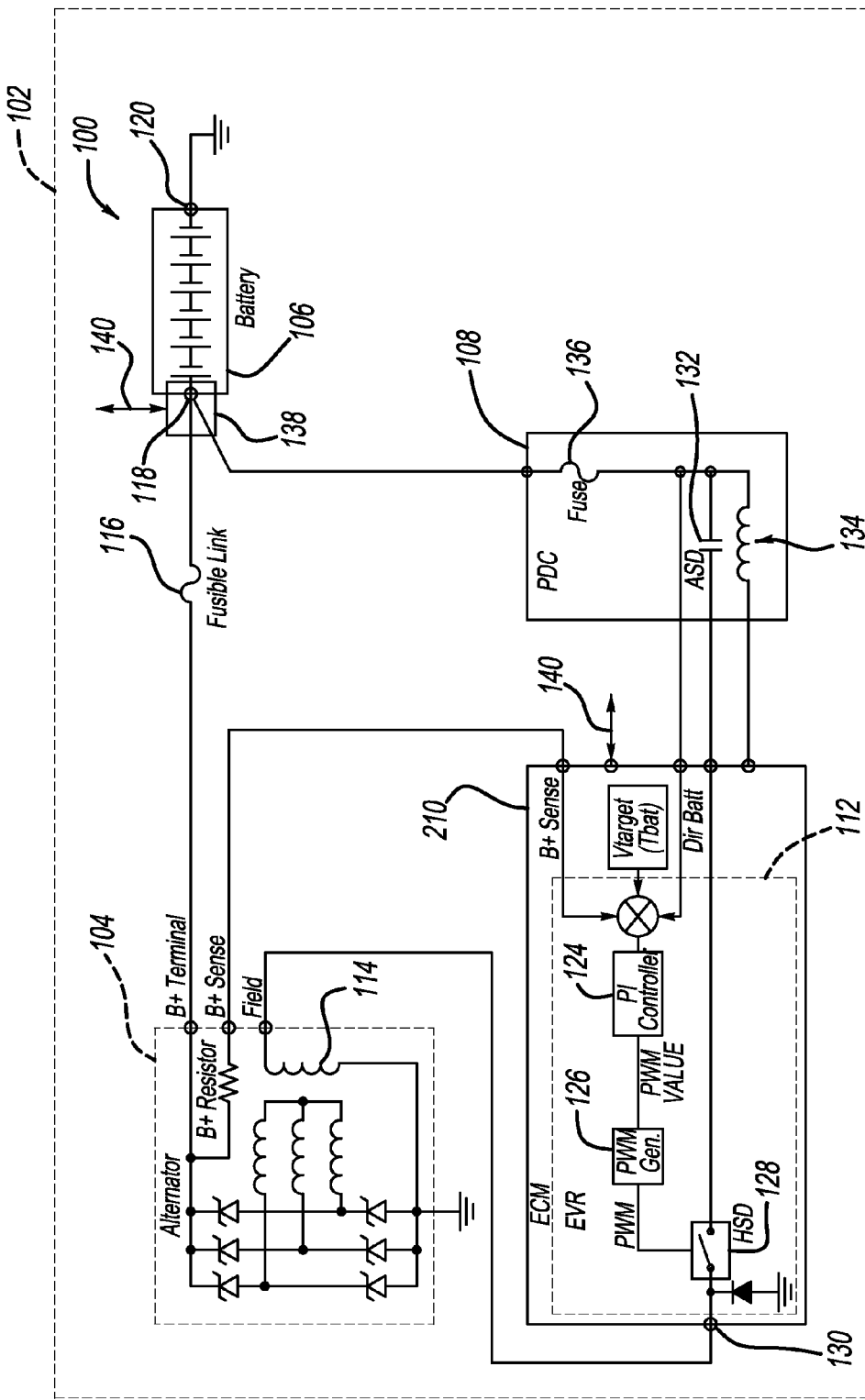
FIG. 2 is a simplified schematic of a vehicle electrical system having an alternator control in accordance with an aspect of the present disclosure.

FIG. 2 is a simplified schematic of a vehicle electrical system 200. Other than the differences discussed below pertaining to the control of alternator 104, the vehicle electrical system 200 is the same as the prior art vehicle electrical system 100 shown in FIG. 1. Vehicle electrical system 200 differs from vehicle electrical system 100 in the way in which alternator 104 is controlled to optimize the charging of battery 106. In vehicle electrical system 200, one of a plurality of control modes for controlling alternator 104 is selected based upon an operating state of the vehicle as determined from vehicle operating parameters. A range for a set point voltage which determines a voltage output of alternator 104 is set based on the selected control mode and the set point voltage is then set within that range based on a feedback parameters for that control mode. In an aspect, the control modes include a trickle charge mode and battery charge current is the feedback parameter and the ECU controls the set point voltage within the range to maintain a predetermined battery charge current. Battery charge current as used herein is the current that is charging battery, which is provided by the alternator. In an aspect, the vehicle operating states control modes also include a Regeneration Mode, a battery Low State of Charge (SOC) Mode, a Passive Boost Mode, and a Default Mode. In an aspect, battery temperature is the feedback parameter for the Regeneration Mode, Low SOC Mode, Passive Boost Mode and Default Mode and the voltage set point is controlled to maintain battery charge capacity during a predetermined temperature. In an aspect, the control modes are implemented in a software program in ECU 210, and ECU 210 differs from ECU 110 by ECU 210 having this software program.

In the Regeneration Mode, low cost deceleration energy is used to aggressively charge the battery. The Low SOC Mode protects the battery from extended low state of charge periods. The Passive Boost Mode lowers the engine accessory load during high engine load, with alternator torque savings reduced at higher RPMs. The Trickle Charge Mode maintains the battery state without depleting SOC and engine accessory load is decreased by not overcharging the battery. The Default Mode is a failsafe mode when the vehicle operating state is not suitable for any of the other control modes.

Figure 3:
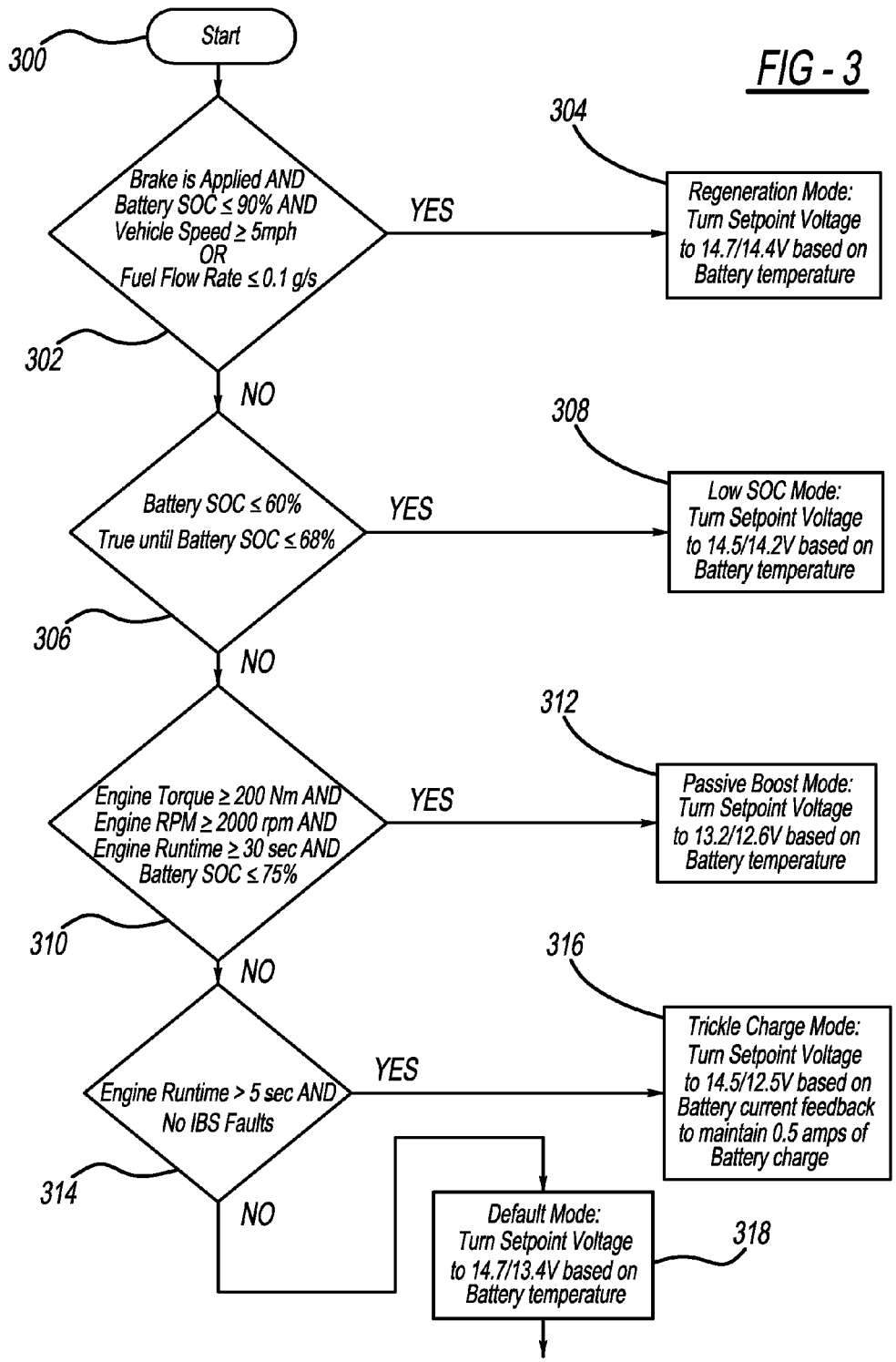
FIG. 3 is a flow chart of a simplified program for the alternator control of FIG. 2.

FIG. 3 is a flow chart of an illustrative software program implementing the above described control modes. Control starts at 300. At 302, ECU determines whether to branch to regeneration mode 304. It does so based on one or more vehicle operating parameters. Illustratively, these vehicle operating parameters are whether a vehicle brake has been applied, battery SOC, vehicle speed and fuel flow rate. More specifically, if the vehicle brake is being applied, battery SOC is at or below a threshold $T_{SOC1}$, and either vehicle speed is at or above a threshold $T_{vpeed1}$ or fuel flow rate is at or below a threshold $T_{ff1}$, ECU 210 branches to regeneration mode 304. At Regeneration Mode 304, ECU 210 sets the set point voltage range to a range $V_{RMH}/V_{RML}$, which is illustratively 14.7/14.4 V and sets the set point voltage within this range based on battery temperature to maintain a predetermined battery temperature. As used herein, the reference to a range Term1/Term 2 means a range from Term1 to Term 1. For example, a reference to a range such as 14.7/14.4 V means a range from 14.7 V to 14.4 V. It should also be understood that V means DC (direct current) volts. ECU 210 then returns to 300. Illustratively as shown in FIG. 3, $T_{SOC1}$ may be 90%, $T_{vpeed1}$ may be 5 mph and $T_{ff1}$ may be 0.1 gal/sec. It should be understood that the values for the set point voltage range and each of these thresholds are illustrative values and different values can be used for these thresholds.

If at 302 ECU 210 did not branch to regeneration mode 304, at 306 ECU 210 determines whether to branch to Low SOC Mode 308. It does so based on one or more vehicle operating parameters, illustratively battery SOC. More specifically, if battery SOC is at or below threshold $T_{SOC2}$, ECU 210 branches to Low SOC Mode 308. At Low SOC Mode 308, ECU 210 sets the set point voltage range to a range $V_{SOCH}/V_{SOCL}$, which is illustratively 14.5/14.2V, and sets the set point voltage within this range based on battery temperature to maintain a predetermined battery temperature. ECU 210 then returns to 300, but will remain in the Low SOC Mode until battery SOC is at or above threshold $T_{SOC3}$. Illustratively as shown in FIG. 3, $T_{SOC2}$ may be 60%, $T_{SOC3}$ may be 68%. It should be understood that the values for set point voltage range and each of these thresholds are illustrative values and different values can be used for these thresholds.

If at 306 ECU 210 did not branch to Low SOC Mode 308, at 310 ECU 210 determines whether to branch to Passive Boost Mode 312. It does so based on one or more vehicle operating parameters. Illustratively, the vehicle operating parameters are engine torque, engine RPM, engine runtime (the time that the engine has been running) and battery SOC. More specifically, if engine torque is at or above a threshold $T_{ENGTQ}$, engine RPM is at or above a threshold $T_{RPM}$, engine runtime is at or above a threshold $T_{RUNTIME1}$, and battery SOC is at or above a threshold $T_{SOC4}$, ECU 210 branches to Passive Boost Mode 312. At Passive Boost Mode 312, ECU 210 sets the set point voltage range to a range $V_{PBMH}/V_{PBML}$, which is illustratively 13.2/12.6 V, and sets the set point voltage within this range based on battery temperature to maintain a predetermined battery temperature. ECU 210 then returns to 300. Illustratively as shown in FIG. 3, $T_{ENGTQ}$ may be 200 Nm, $T_{RPM}$ may be 2000 RPM, $T_{RUNTIME1}$ may be thirty seconds and $T_{SOC4}$ may be 75%. It should be understood that the values for the set point voltage range and each of these thresholds are illustrative values and different values can be used for these thresholds.

If at 310 ECU 210 did not branch to Passive Boost Mode 312, at 314 ECU 210 determines whether to branch to Trickle Charge Mode 316. It does so based on one or more vehicle operating parameters. Illustratively, the vehicle operating parameters are engine runtime and whether any IBS faults have occurred. More specifically, if engine runtime is at or above a threshold $T_{RUNTIME2}$ and no IBS faults have occurred, ECU 210 branches to Trickle Charge Mode 316. At Passive Boost Mode 312, ECU 210 sets the set point voltage range to a range $V_{TCMH}/V_{TCML}$, which is illustratively 14.5/12.5 V, and sets the set point voltage within this range based on battery current feedback to maintain 0.5 amps of battery charge. ECU 210 then returns to 300. Illustratively as shown in FIG. 3, $T_{RUNTIME2}$ may be five seconds. It should be understood that the values for the set point voltage range and each of these thresholds are illustrative values and different values can be used for these thresholds.

If at 318 ECU 210 did not branch to Trickle Charge Mode 316, ECU 210 continues to Default Mode 318. At Default Mode 318, ECU 210 sets the set point voltage range to a range $V_{DMH}/V_{DML}$, which is illustratively 14.7/13.4 V, and sets the set point voltage within this range based on battery temperature to maintain a predetermined battery temperature. ECU 210 then returns to 300. It should be understood that the values for the set point voltage range are illustrative values and different values can be used.

While FIG. 3 shows the Regeneration Mode, Low SOC Mode, Passive Boost Mode, Trickle Charge Mode and Default Mode, it should be understood that the plurality of control modes could include less than all these modes. For example, the control modes may include the Trickle Charge Mode and the Default Mode.

As used herein, the term ECU module may refer to, be part of, or include: an Application Specific Integrated Circuit (ASIC); a digital signal processor; an electronic circuit; a combinational logic circuit; a field programmable gate array (FPGA); or a processor; other suitable components that provide the described functionality; or a combination of some or all of the above, such as in a system-on-chip. The term module may also include memory (shared, dedicated, or grouped) that stores code executed by the one or more processors.

What is claimed is:

1. An electrical system for an automotive vehicle, comprising:
    an electrical generating machine having a voltage output set by a set point voltage, a battery coupled to the voltage output of the electrical generating machine and an electronic control unit (ECU) that sets the set point voltage; and
    the ECU selecting one of a plurality of control modes to control the electrical generating machine based on vehicle operating parameters, setting a range for the set point voltage based on the selected control mode and setting the set point voltage based on a feedback parameter for that control mode, wherein the control modes include a trickle charge mode wherein the feedback parameter is battery charge current and the ECU sets the set point voltage to maintain the battery charge current at a predetermined level and a regeneration mode wherein one of the vehicle operating parameters that the ECU bases determining whether to branch to the regeneration mode is whether a vehicle brake has been applied and the ECU determining to branch to the regeneration mode only if the vehicle brake has been applied.

2. The electrical system of claim 1 wherein the predetermined level is about 0.5 amps.

3. The electrical system of claim 1 wherein the control modes further include a default mode.

4. The electrical system of claim 3 wherein the control modes further include a battery low state of charge mode, and a passive boost mode.

5. The electrical system of claim 4 wherein:
    for the regeneration mode the set point voltage range is about 14.7/14.4 V and the feedback parameter is ambient temperature;
    for the battery low state of charge mode the set point voltage range is about 14.5/12.6 V and the feedback parameter is battery temperature;
    for the passive boost mode the set point voltage range is about 13.2/12.6 V and the feedback parameter is battery temperature;
    for the trickle charge mode the set point voltage range is about 14.5/12.5 V and the ECU maintains about 0.5 amps of battery charge output from the alternator;
    for the default mode the set point voltage range is about 14.7/13.4 V and the feedback parameter is battery temperature.

6. The electrical system of claim 1 wherein the electrical generating machine is an alternator.

7. The electrical system of claim 6 including an electronic voltage regulator controlled by the ECU to set the set point voltage.

8. The electrical system of claim 7 wherein the ECU includes the electronic voltage regulator.

9. The electrical system of claim 1 including an electronic voltage regulator controlled by the ECU to set the set point voltage.

10. The electrical system of claim 9 wherein the ECU includes the electronic voltage regulator.

11. The electrical system of claim 1 wherein the electrical generating machine is an alternator or a generator.

12. The electrical system of claim 1 wherein the vehicle operating parameters that the ECU bases determining whether to branch to the regeneration mode also include a battery state of charge, vehicle speed and vehicle fuel rate, and the ECU determining to branch to the regeneration mode when in addition to the vehicle brake having been applied, the battery state of charge is at or below a battery state of charge threshold and either the vehicle speed is at or above a vehicle speed threshold or the vehicle fuel flow rate is at or below a vehicle fuel flow rate threshold.

13. A method of controlling an electrical generating machine in an electrical system of an automotive vehicle, the electrical generating machine having a voltage output set by a set point voltage, a battery coupled to the voltage output of the electrical generating machine and an electronic control unit (ECU) that sets the set point voltage, the method comprising:
    selecting with the ECU one of a plurality of control modes to control the electrical generating machine based on vehicle operating parameters, setting with the ECU a range for the set point voltage based on the selected control mode and setting with the ECU the set point voltage based on a feedback parameter for that control mode, wherein the control modes include a trickle charge mode wherein the feedback parameter is battery charge current and setting the set point voltage with the ECU includes setting the set point voltage to maintain the battery charge current at a predetermined level, the control modes also including a regeneration mode and one of the vehicle operating parameters used by the ECU in determining whether to branch to the regeneration mode is whether a vehicle brake has been applied and selecting with the ECU to branch to the regeneration mode only if the vehicle brake has been applied.

14. The method of claim 13 wherein setting the set point voltage to maintain the battery charge current at a predetermined level includes setting the battery charge current to maintain the battery charge current at about 0.5 amps.

15. The method of claim 13 wherein selecting with the ECU one of a plurality of control modes includes selecting from among the trickle charge mode and a default mode.

16. The method of claim 15 wherein selecting with the ECU one of a plurality of control modes includes selecting from among the trickle charge mode, the default mode, the regeneration mode, a battery low state of charge mode and a passive boost mode.

17. The method of claim 15, wherein:
setting with the ECU the voltage set point voltage range includes:
for the Regeneration Mode, setting the voltage set point range to about 14.7/14.4 V and the feedback parameter is battery temperature;
for the Low SOC Mode, setting the set point voltage range to about 14.5/12.6 V and the feedback parameter is battery temperature;
for the passive boost mode, setting the set point voltage range to about 13.2/12.6 V and the feedback parameter is battery temperature;
for the Trickle Charge Mode, setting the set point voltage range to about 14.5/12.5 V and setting with the ECU the voltage set point to maintain about 0.5 amps of battery current charge; and
for the default mode, setting the set point voltage range to about 14.7/13.4 V and the feedback parameter is battery temperature.

18. The method of claim 17 including controlling an electronic voltage regulator with the ECU to set the set point voltage.

19. The method of claim 13 including controlling an electronic voltage regulator with the ECU to set the set point voltage.

20. The method of claim 13 wherein the vehicle operating parameters used in selecting with the ECU to branch to the regeneration mode also include a battery state of charge, vehicle speed and vehicle fuel rate, and selecting with the ECU to branch to the regeneration mode when in addition to the vehicle brake having been applied, the battery state of charge is at or below a battery state of charge threshold and either the vehicle speed is at or above a vehicle speed threshold or the vehicle flow rate is at or below a vehicle flow rate threshold.

* * * * *